Nov. 8, 1955 — R. T. SPEDDING ET AL — 2,722,798
CUTTER BAR ASSEMBLY
Filed Oct. 22, 1953
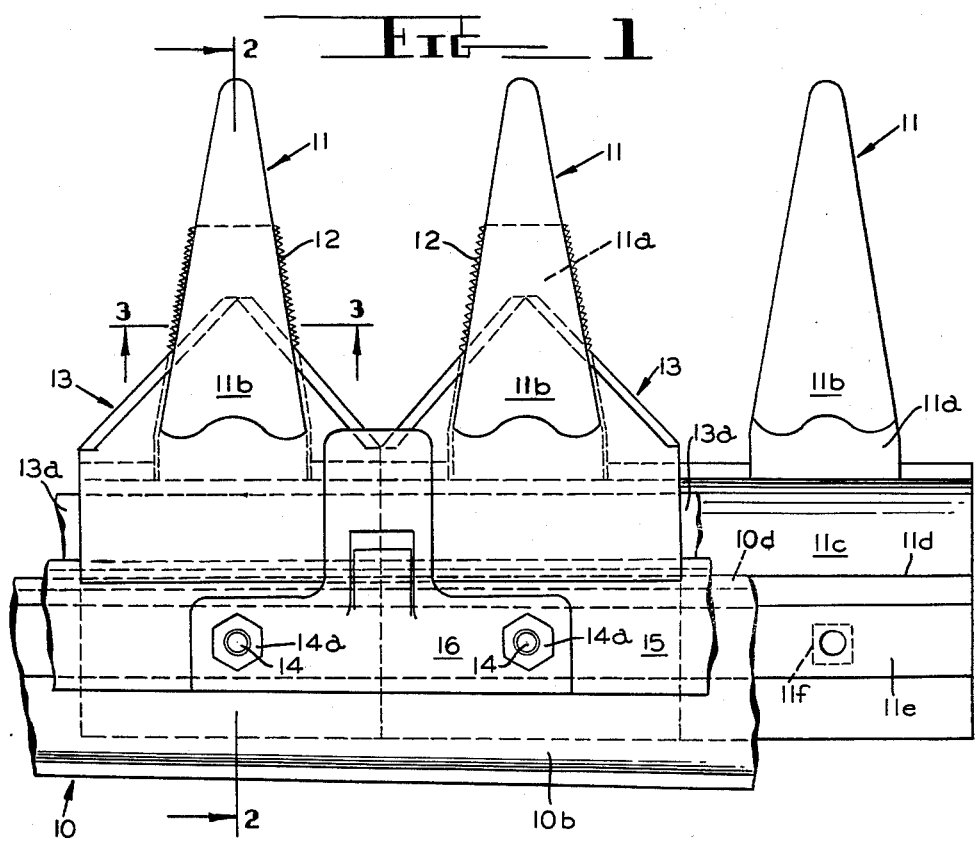
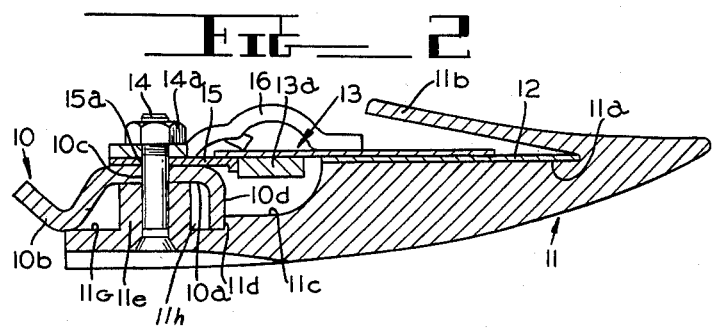
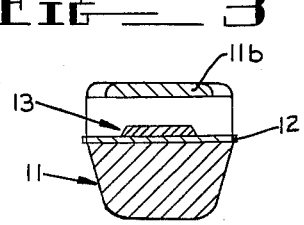
INVENTOR.
R.T. SPEDDING
D.J. MC GEE
BY
ATTORNEYS

United States Patent Office 2,722,798
Patented Nov. 8, 1955

2,722,798

CUTTER BAR ASSEMBLY

Raymond T. Spedding and Donald J. McGee, Birmingham, Mich., assignors to Ford Motor Company, Dearborn, Mich., a corporation of Delaware Application October 22, 1953, Serial No. 387,707

2 Claims. (Cl. 56—298)

This invention relates to an improved cutter bar assembly for agricultural mowers of the reciprocating knife type.

An object of this invention is to provide an improved simplified design of cutter bar assembly which will permit the utilization of light weight materials, such as aluminum, magnesium, or alloys of the same, in the fabrication of the principal components of such cutter bar assembly so as to substantially reduce the total weight of such assembly without detracting from its performance or durability characteristics.

A particular object of this invention is to provide a main beam element or cutter bar for a cutter bar assembly of unique configuration which is uniquely cooperable with a plurality of specially designed guard elements to provide a rigid, durable, yet extremely light weight cutter bar unit when the rock guards are assembled to the main frame element.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is a fragmentary plan view of a cutter bar assembly for a reciprocating-type mower constructed in accordance with this invention.

Figure 2 is a vertical sectional view taken on the plane 2—2 of Figure 1.

Figure 3 is a sectional view taken on the plane 3—3 of Figure 1.

Referring to the drawings, a cutter bar assembly embodying this invention utilizes a main frame element, cutter bar or beam 10 of unique configuration. The elongated cutter bar 10 has a cross section which may be generally described as S-shaped and, more specifically described as having a forward downwardly facing concave portion 10a integrally joined with a rearward downwardly facing convex portion 10b. As is customary in reciprocating knife type cutter bar assemblies, the cutter bar 10 when operating is normally supported at one end and disposed in a horizontal plane. To further decrease the total weight of the cutter bar 10 without substantially effecting its strength characteristics, the cutter bar 10 tapers in overall width i. e., the distance from the forward lateral edge to the rearward lateral edge, from its supported or inboard end to its free or outboard end, as is indicated in Figure 1. A plurality of vertical rock guard mounting holes 10c are provided in spaced relationship along the central portion of the forward concave portion 10a of cutter bar 10.

A plurality of rock guards 11 are provided which are preferably cast from aluminum, magnesium or similar light weight material. The forward portion of each rock guard 11 is of conventional configuration embodying a triangularly shaped horizontal top surface 11a upon which a ledger plate 12 is suitably bonded in conventional fashion. Rearwardly and upwardly extending guard projection 11b is integrally formed on rock guard 11 and overlies the ledger plate 12 to protect the reciprocating knife from contact with rocks or other damaging materials. In its medial portion, each rock guard 11 is provided with a vertically open recess 11c within which the backing strip 13a of the conventional reciprocating knife 13 is received.

Immediately rearward of the recess 11c, each rock guard 11 is provided with an upwardly opening vertical slot 11h having a vertically continuous walled ledge 11d which is proportioned to abut the forward downturned lateral edge 10d of the concave portion 10a of the cutter bar 10. Rearwardly of ledge 11d, the rock guard is provided with an integral upstanding projection or boss 11e which abuttingly engages the downwardly facing surface of the concave portion 10a of the cutter bar 10. Each rock guard 11 is further provided with a vertical aperture 11f, extending through the upstanding projection or boss 11e, which is traversed by a mounting bolt 14 which also passes through the rock guard mounting holes 10c provided in the cutter bar 10.

Lastly, the extreme rear end of each rock guard 11 is provided with a surface 11g which is shaped to abut the downwardly facing surface of the convex portion 10b of the cutter bar 10.

A knife guard strip 15 is mounted on top of the forward portion 10a of the cutter bar 10 and provided with suitable apertures 15a respectively alignable with the rock guard mounting holes 10c. Hence the tightening of a nut 14a on bolt 14 will effect the rigid securement of the particular rock guard 11 to the cutter bar 10 and the guard strip 15. Wherever desired along the length of the assembly, a hold down clip 16 may also be mounted in overlying relationship to the knife by being mounted on the bolt 14 and secured by the nut 14a. The rock guards are of course, mounted in abutting relationship along cutter bar 10.

From the foregoing description it is apparent that the described configuration of the cutter bar 10 and the rock guards 11 permit such units to be drawn into rigid assembly by a single bolt. Furthermore, the rock guard serves to laterally reinforce the cutter bar 10 so as to substantially increase the rigidity of such cutter bar irrespective of the fact that it is fabricated from a light weight low strength material.

Accordingly, with the aforedescribed construction, it has been possible to effect a reduction in weight of up to 50 per cent without substantially decreasing the performance or durability characteristics of such assembly.

It will, of course, be understood that various details of construction may be varied through a wide range without departing from the principles of this invention and it is, therefore, not the purpose to limit the patent granted hereon otherwise than necessitated by the scope of the appended claims.

We claim:

1. A light weight cutter bar assembly for reciprocating knife-type mowers comprising a horizontally elongated main beam element having a vertical cross sectional configuration defined by a forward downwardly facing concave portion and a rearward downwardly facing convex portion, said beam element having a forward to rear width taperingly decreasing from the inboard end thereof to the outboard end, and a plurality of rock guards secured in adjacent relationship along the length of said beam element, each of said rock guards having a vertically continuous walled ledge formed thereon for abutting a portion of the forward lateral edge of said beam element, and an upstanding boss portion constructed and arranged to conform to and abut the downwardly facing concave portion of said main beam element, thereby reinforcing said main beam element and bolt means traversing said beam element and said boss portion of each of said rock guards.

2. A light weight cutter bar assembly for reciprocating knife-type mowers comprising a horizontally elongated main beam element having a vertical cross sectional configuration defined by a forward downwardly facing concave portion and a rearward downwardly facing convex portion, and a plurality of rock guards secured in adjacent relationship along the length of said beam element, each of said rock guards having an upwardly opening vertical slot formed therein for abutting a portion of the forward lateral edge of said beam element, and an upstanding boss portion constructed and arranged to conform to and abut the downwardly facing concave surface of said main beam element, the rear end of each of said rock guards being adapted to abut the downwardly facing convex surface of said main beam element, thereby reinforcing said beam element, and bolt means traversing said main beam element and said boss portion of each of said rock guards.

References Cited in the file of this patent

UNITED STATES PATENTS

| | | |
|---|---|---|
| 441,337 | Smith | Nov. 25, 1890 |
| 1,789,781 | Seidel | Jan. 20, 1931 |
| 2,637,158 | Hauswirth | May 5, 1953 |